United States Patent [19]
Edwards

[11] Patent Number: 6,055,015
[45] Date of Patent: Apr. 25, 2000

[54] PICTURE QUALITY MONITORING SYSTEM

[75] Inventor: John W. Edwards, Lake Oswego, Oreg.

[73] Assignee: Tektronix, Inc., Beaverton, Oreg.

[21] Appl. No.: 09/122,612

[22] Filed: Jul. 25, 1998

[51] Int. Cl.$^7$ ................................................. H04N 17/00
[52] U.S. Cl. ............................................ 348/192; 348/184
[58] Field of Search ................................. 348/192, 193, 348/180, 571, 184, 181

[56] References Cited

U.S. PATENT DOCUMENTS

| | | | |
|---|---|---|---|
| 5,274,446 | 12/1993 | Ashida | 348/192 |
| 5,446,492 | 8/1995 | Wolf et al. | 348/192 |
| 5,574,499 | 11/1996 | Nasu | 348/180 |
| 5,574,500 | 11/1996 | Hamada et al. | 348/180 |
| 5,751,766 | 5/1998 | Kletsky et al. | 348/193 |
| 5,862,451 | 1/1999 | Grau et al. | 348/192 |

*Primary Examiner*—Victor R Kostak
*Attorney, Agent, or Firm*—Francis I. Gray

[57] ABSTRACT

A picture quality monitoring system for a television chain provides incremental metrics for each layer of the chain—video, compression and modulation. The output of each layer is stored as a reference signal for the next or subsequent layers. The output from each layer is compared with the output from a prior layer to determine an incremental degradation metric. All of the incremental degradation metrics may be combined to produce an overall degradation metric for the entire television chain.

2 Claims, 1 Drawing Sheet

PICTURE QUALITY MONITORING SYSTEM

CROSS-REFERENCE TO RELATED APPLICATIONS

Not applicable

REFERENCE TO GOVERNMENT SPONSORED RESEARCH OR DEVELOPMENT

Not applicable

BACKGROUND OF THE INVENTION

The present invention relates to the measurement of picture quality in a digital video system, and more particularly to a picture quality monitoring system for measuring picture quality at all layers in a television program chain.

Because conventional methods for assessing picture quality of a video sequence assume a linear system, they are not effective in testing compressed video systems, which are nonlinear. Thus alternate methods are needed. One such method is picture differencing, such as is described in allowed U.S. Pat. No. 5,818,520 issued Oct. 6, 1998 by Bozidar Janko and David Fibush entitled "Programmable Instrument for Automatic Measurement of Compressed Video Quality." Here a test video sequence is passed through the system under test and then compared with the original version of the test video sequence using the Sarnoff JND-Metrix technology. However such a system gives an overall metric for the entire system, while not identifying the portion of the system that represents the greatest degradation.

What is desired is a picture quality monitoring system that applies the difference test to all layers in a television program chain—video, compression and RF.

BRIEF SUMMARY OF THE INVENTION

Accordingly the present invention provides a picture quality monitoring system that applies a picturing differencing algorithm to all layers in a television program chain using a local reference video sequence at each point in the distribution system. A program feed from a video source is an initial local reference from the video layer for comparison with the output signal from each subsequent layer. A decoded compression output is stored as the local reference from the compression layer for comparison with subsequent layers, and the output from the modulation layer is the initial local reference signal for the a receive site for comparison with subsequent layers. Likewise each layer at the receive site provides a local reference for the next layer. Each comparison provides an incremental degradation score, and the combination of the incremental degradation scores provides an overall degradation metric for the system.

The objects, advantages a nd other novel features of the present invention are apparent from the following detailed description when read in conjunction with the appended claims and attached drawing.

DETAILED DESCRIPTION OF THE INVENTION

Figure 1:
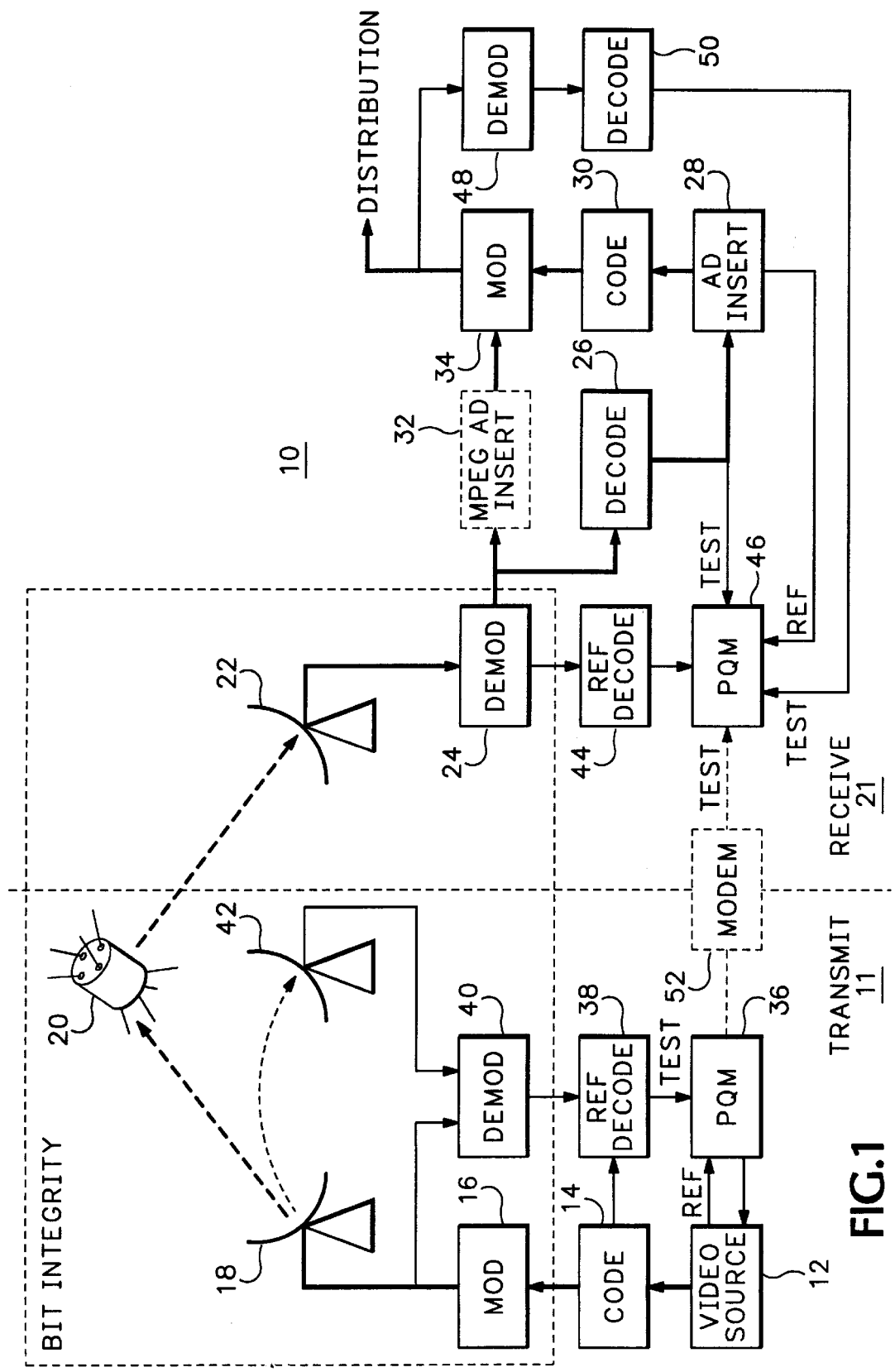
FIG. 1 is a block diagram of a television program chain using a picture quality monitoring system according to the present invention.

Referring now to FIG. 1 a television system 10 is shown, with the signal path shown by the heavy lines. At a transmit site 11 a video sequence is generated from a source 12 and input to a compression coder 14. The compressed video sequence from the compression coder 14 is then input to a modulator 16 to produce an RF modulated video sequence. The RF modulated video sequence is broadcast by suitable means, such as an antenna 18 and satellite 20 link. At a receive site 21 the RF modulated video sequence is received by a suitable means, such as an antenna 22. The received video sequence is input to a demodulator 24, and the demodulated video sequence is input to a compression decoder 26. The decompressed video sequence is then input to an ad insertion device 28 to insert local content and then input to another compression coder 30. Alternatively an MPEG ad insertion device 32 may be used to insert the local content directly into the demodulated video sequence to save one generation of compression. In either event the compressed video sequence with local content is again input to a modulator 34 for distribution over a local distribution chain, such as a cable TV system.

The video distribution system shown in FIG. 1 may be considered as having a contribution element, or transmission site 11, and a distribution element, or receive site 21. The contribution element combines program material from several sources into a single program feed from the video source 12 as the video sequence, compresses the program feed, and then modulates the compressed program feed for a transmission path. The distribution element receives this signal from the transmission path, often adding more content to the program, compresses it and distributes it. Thus there are three layers to the system—the program video layer, the compressed video layer and the modulated video layer. Any point in the contribution side of the system may be tested by comparison with the original program feed or by comparison with any other previous layer of processing. This enables assessment of total degradation or incremental degradation for each layer.

The program feed from the video source 12 is applied to an input of a picture quality measurement (PQM) device 36 as a reference video sequence. The output from the compression coder 14, where degradation typically occurs, is then decoded by a reference quality decoder 38 and applied to another input of the PQM device 36 where it is compared with the original program feed from the video source 12. The result of this comparison is used as an indicator of the compression layer performance. The output from the reference quality decoder 38 also is stored in the PQM device 36 for use as a reference for testing the modulation layer.

To test the modulation layer the RF modulated video sequence from the modulator 16 is input to a demodulator 40 and decoded through the reference quality decoder 38 as described above. A differential modulator score is obtained by comparison at the PQM device 36 of the demodulated and decoded output with the decoded coder output already stored in the PQM device from the previous compression layer test. An incremental score may be obtained by using the video source output, also stored in the PQM device 36 during the compression layer test, as a reference. The resulting quality score at the PQM device 36 indicates total picture degradation through both the compression and modulation layers. This demodulated and decoded output also is stored in the PQM device 36 as the reference for uplink testing. The uplink output is tested in the same manner via a test antenna 42.

The entire transport layer—modulation, uplink, downlink and demodulation—is not subject to compression errors. Instead it is vulnerable to bit integrity errors caused by such things as noise burst in the transmission path. For testing this portion, bit error rate testing and possibly protocol testing of the compressed transport stream may be used.

At the distribution element, or receive site 21, the demodulator 24 and a reference decoder 44 are functionally identical to the demodulator 40 and reference decoder 38 in the contribution element. Therefore the received video sequence input to a receiver PQM device 46 has the same degradations as the contribution signal—assuming error-free transmission of the signal. The receive decoder 26 and reference decoder 44 may also be identical, but this is not necessary. The received signal is the local reference signal for the receive site 21. In the same manner as described above for the contribution element testing, each block in each layer at the receive site 21 may be differentially tested by comparison with the previous layer, or incrementally tested by comparison with the received video sequence, in the receiver PQM device 46. An additional demodulator 48 and decoder 50 are used for testing the final modulation layer at the distribution network output.

Testing with a nonlocal reference is achieved by sending a nondegraded version of the video from the source 12 to both the transmit and receive PQM devices 36, 46, using either a modem 52 and normal telephony for transmission to the remote site or inserting the program feed, or portion thereof, into the compressed video transmission path, as described in co-pending U.S. patent application Ser. No. 09/026,758 filed Feb. 20, 1998 by Bozidar Janko entitled "Low Duty-Cycle Transport of Video Reference Images."

Thus the present invention provides a picture quality monitoring system for a television program chain that allows both the total and incremental degradation scores for each layer of the chain by using as a local reference the video sequence from a prior layer.

What is claimed is:

1. A picture quality monitoring system for a television chain having a contribution element and a distribution element, each element having at least two layers of video processing, the picture quality monitoring system providing an indication of an amount of degradation between any layers within the television chain, comprising:

means for storing a separate local reference signal for each layer, the separate local reference signal for each layer being obtained as the output from an immediate prior layer; and means for comparing the separate local reference signal from a particular prior layer with an output signal from a current layer to determine an incremental metric of the amount of picture degradation between the particular prior layer and the current layer.

2. The system as recited in claim 1 further comprising means for combining the incremental metric for each of the layers to determine an overall metric for the system.

* * * * *